United States Patent
Bertness

(10) Patent No.: US 6,363,303 B1
(45) Date of Patent: Mar. 26, 2002

(54) ALTERNATOR DIAGNOSTIC SYSTEM

(75) Inventor: Kevin I. Bertness, Batavia, IL (US)

(73) Assignee: Midtronics, Inc., Willowbrook, IL (US)

( * ) Notice: Subject to any disclaimer, the term of this patent is extended or adjusted under 35 U.S.C. 154(b) by 0 days.

(21) Appl. No.: 09/431,446

(22) Filed: Nov. 1, 1999

(51) Int. Cl.[7] .............................. G06F 7/00; G06F 19/00
(52) U.S. Cl. ........................... 701/29; 701/31; 340/439; 320/150; 381/71.1
(58) Field of Search .............................. 701/29, 31, 33, 701/34, 39; 340/429, 439; 415/119; 381/71.1, 71.2; 320/150; 322/33, 99; 324/315, 317, 500, 501

(56) References Cited

U.S. PATENT DOCUMENTS

| | | | |
|---|---|---|---|
| 2,514,745 A | 7/1950 | Dalzell | 171/95 |
| 3,356,936 A | 12/1967 | Smith | 324/29.5 |
| 3,562,634 A | 2/1971 | Latner | 31/4 |
| 3,593,099 A | 7/1971 | Scholl | 320/13 |
| 3,607,673 A | 9/1971 | Seyl | 204/1 |
| 3,676,770 A | 7/1972 | Sharaf et al. | 324/29.5 |
| 3,729,989 A | 5/1973 | Little | 73/133 |
| 3,753,094 A | 8/1973 | Furuishi et al. | 324/29.5 |
| 3,808,522 A | 4/1974 | Sharaf | 324/29.5 |
| 3,811,089 A | 5/1974 | Strezelewicz | 324/170 |
| 3,873,911 A | 3/1975 | Champlin | 324/29.5 |
| 3,876,931 A | 4/1975 | Godshalk | 324/29.5 |
| 3,886,443 A | 5/1975 | Miyakawa et al. | 324/29.5 |
| 3,889,248 A | 6/1975 | Ritter | 340/249 |
| 3,906,329 A | 9/1975 | Bader | 320/44 |
| 3,909,708 A | 9/1975 | Champlin | 324/29.5 |
| 3,936,744 A | 2/1976 | Perlmutter | 324/158 |
| 3,946,299 A | 3/1976 | Christianson et al. | 320/43 |
| 3,947,757 A | 3/1976 | Grube et al. | 324/28 |
| 3,969,667 A | 7/1976 | McWilliams | 324/29.5 |
| 3,979,664 A | 9/1976 | Harris | 324/17 |
| 3,984,762 A | 10/1976 | Dowgiallo, Jr. | 324/29.5 |
| 3,984,768 A | 10/1976 | Staples | 324/62 |
| 3,989,544 A | 11/1976 | Santo | 429/65 |
| 4,008,619 A | 2/1977 | Alcaide et al. | 73/398 |
| 4,053,824 A | 10/1977 | Dupuis et al. | 324/29.5 |

(List continued on next page.)

FOREIGN PATENT DOCUMENTS

| | | |
|---|---|---|
| DE | 29 26 716 B1 | 1/1981 |
| EP | 0 022 450 A1 | 1/1981 |
| EP | 0 637 754 A1 * | 2/1995 |
| EP | 0 772 056 A1 * | 5/1997 |
| FR | 2 749 397 | 12/1997 |
| GB | 2 088 159 A * | 6/1982 |
| JP | 59017894 | 1/1984 |

(List continued on next page.)

OTHER PUBLICATIONS

"Electrochemical Impedance Spectroscopy in Battery Development and Testing", *Batteries International*, Apr. 1997, pp. 59 and 62–63.

"Battery Impedance", by E. Willinhganz et al., *Electrical Engineering*, Sep. 1959, pp. 922–925.

"Dtermining The End of Battery Life", by S. DeBardelaben, *IEEE*, 1986, pp. 365–368.

"A Look at the Impedance of a Cell", by S. Debardelaben, *IEEE*, 1988, pp. 394–397.

"The Impedance of Electrical Storage Cells", by N.A. Hampson et al., *Journal of Applied Electochemistry*, 1980, pp. 3–11.

*Primary Examiner*—Gertrude Arthur
(74) *Attorney, Agent, or Firm*—Westman, Champlin & Kelly, P.A.

(57) ABSTRACT

An apparatus for testing an alternator in an automotive vehicle includes a sensor positioned proximate the alternator which provides a vibration output related to vibrations generated by operation of the alternator. A diagnostic system diagnoses the condition of the alternator based upon sensed vibrations. A temperature sensor can also be employed.

67 Claims, 3 Drawing Sheets

U.S. PATENT DOCUMENTS

| | | | |
|---|---|---|---|
| 4,070,624 A | 1/1978 | Taylor | 327/158 |
| 4,086,531 A | 4/1978 | Bernier | 324/158 |
| 4,112,351 A | 9/1978 | Back et al. | 324/16 |
| 4,114,083 A | 9/1978 | Benham et al. | 320/39 |
| 4,126,874 A | 11/1978 | Suzuki et al. | 354/60 |
| 4,178,546 A | 12/1979 | Hulls et al. | 324/158 |
| 4,193,025 A | 3/1980 | Frailing et al. | 324/427 |
| 4,207,611 A | 6/1980 | Gordon | 364/580 |
| 4,315,204 A | 2/1982 | Sievers et al. | 322/28 |
| 4,316,185 A | 2/1982 | Watrous et al. | 340/636 |
| 4,322,685 A | 3/1982 | Frailing et al. | 324/429 |
| 4,363,407 A | 12/1982 | Barkler et al. | 209/3.3 |
| 4,369,407 A | 1/1983 | Korbell | 324/416 |
| 4,379,990 A | 4/1983 | Sievers et al. | 322/99 |
| 4,390,828 A * | 6/1983 | Converse et al. | 320/32 |
| 4,392,101 A * | 7/1983 | Saar et al. | 320/20 |
| 4,396,880 A * | 8/1983 | Windebank | 320/21 |
| 4,408,157 A * | 10/1983 | Beaubien | 324/62 |
| 4,412,169 A | 10/1983 | Dell'Orto | 320/64 |
| 4,423,378 A * | 12/1983 | Marino et al. | 324/427 |
| 4,423,379 A * | 12/1983 | Jacobs et al. | 324/429 |
| 4,424,491 A * | 1/1984 | Bobbett et al. | 324/433 |
| 4,459,548 A * | 7/1984 | Lentz et al. | 324/158 |
| 4,514,694 A * | 4/1985 | Finger | 324/429 |
| 4,520,353 A * | 5/1985 | McAuliffe | 340/636 |
| 4,659,977 A * | 4/1987 | Kissel et al. | 320/150 |
| 4,667,279 A * | 5/1987 | Maier | 363/46 |
| 4,678,998 A * | 7/1987 | Muramatsu | 324/427 |
| 4,679,000 A * | 7/1987 | Clark | 324/428 |
| 4,697,134 A * | 9/1987 | Burkum et al. | 320/48 |
| 4,707,795 A | 11/1987 | Alber et al. | 364/550 |
| 4,709,202 A | 11/1987 | Koenck et al. | 320/43 |
| 4,710,861 A | 12/1987 | Kanner | 363/46 |
| 4,719,428 A | 1/1988 | Liebermann | 324/436 |
| 4,743,855 A | 5/1988 | Randin et al. | 324/430 |
| 4,745,349 A | 5/1988 | Palanisamy et al. | 320/22 |
| 4,816,768 A | 3/1989 | Champlin | 324/428 |
| 4,820,966 A | 4/1989 | Fridman | 320/32 |
| 4,825,170 A | 4/1989 | Champlin | 324/436 |
| 4,849,700 A | 7/1989 | Morioka et al. | 324/427 |
| 4,876,495 A | 10/1989 | Palanisamy et al. | 320/18 |
| 4,881,038 A | 11/1989 | Champlin | 324/426 |
| 4,912,416 A | 3/1990 | Champlin | 324/430 |
| 4,913,116 A * | 4/1990 | Katogi et al. | 123/406.32 |
| 4,929,931 A | 5/1990 | McCuen | 340/636 |
| 4,931,738 A | 6/1990 | MacIntyre et al. | 324/435 |
| 4,937,528 A | 6/1990 | Palanisamy | 324/430 |
| 4,947,124 A | 8/1990 | Hauser | 324/430 |
| 4,956,597 A | 9/1990 | Heavvvvey et al. | 320/14 |
| 4,968,941 A | 11/1990 | Rogers | 324/428 |
| 4,968,942 A | 11/1990 | Palanisamy | 324/430 |
| 5,004,979 A | 4/1991 | Marino et al. | 324/160 |
| 5,032,825 A | 7/1991 | Xuznicki | 340/636 |
| 5,047,722 A | 9/1991 | Wurst et al. | 324/430 |
| 5,087,881 A | 2/1992 | Peacock | 324/378 |
| 5,126,675 A | 6/1992 | Yang | 324/435 |
| 5,140,269 A | 8/1992 | Champlin | 324/433 |
| 5,144,218 A | 9/1992 | Bosscha | 320/44 |
| 5,144,248 A | 9/1992 | Alexandres et al. | 324/428 |
| 5,160,881 A * | 11/1992 | Schramm et al. | 322/7 |
| 5,170,124 A | 12/1992 | Blair et al. | 324/434 |
| 5,179,335 A | 1/1993 | Nor | 320/21 |
| 5,204,611 A | 4/1993 | Nor et al. | 320/21 |
| 5,214,370 A | 5/1993 | Harm et al. | 320/35 |
| 5,214,385 A | 5/1993 | Gabriel et al. | 324/434 |
| 5,241,275 A | 8/1993 | Fang | 324/430 |
| 5,254,952 A | 10/1993 | Salley et al. | 324/429 |
| 5,266,880 A | 11/1993 | Newland | 320/14 |
| 5,281,919 A | 1/1994 | Palanisamy | 324/427 |
| 5,281,920 A | 1/1994 | Wurst | 324/430 |
| 5,295,078 A | 3/1994 | Stich et al. | 364/483 |
| 5,298,797 A | 3/1994 | Redl | 307/246 |
| 5,300,874 A | 4/1994 | Shimamoto et al. | 320/15 |
| 5,302,902 A | 4/1994 | Groehl | 324/434 |
| 5,315,287 A | 5/1994 | Sol | 340/455 |
| 5,331,268 A | 7/1994 | Patino et al. | 320/20 |
| 5,336,993 A | 8/1994 | Thomas et al. | 324/158.1 |
| 5,338,515 A * | 8/1994 | Dalla Betta et al. | 422/95 |
| 5,343,380 A | 8/1994 | Champlin | 363/46 |
| 5,347,163 A | 9/1994 | Yoshimura | 307/66 |
| 5,352,968 A | 10/1994 | Reni et al. | 320/35 |
| 5,365,160 A | 11/1994 | Leppo et al. | 320/22 |
| 5,365,453 A | 11/1994 | Startup et al. | 364/481 |
| 5,381,096 A | 1/1995 | Hirzel | 324/427 |
| 5,426,371 A | 6/1995 | Salley et al. | 324/429 |
| 5,432,426 A | 7/1995 | Yoshida | 320/20 |
| 5,434,495 A | 7/1995 | Toko | 320/44 |
| 5,435,185 A * | 7/1995 | Eagan | |
| 5,442,274 A | 8/1995 | Tamai | 320/23 |
| 5,445,026 A * | 8/1995 | Eagan | |
| 5,449,996 A | 9/1995 | Matsumoto et al. | 320/20 |
| 5,449,997 A | 9/1995 | Gilmore et al. | 320/39 |
| 5,451,881 A | 9/1995 | Finger | 324/433 |
| 5,457,377 A | 10/1995 | Jonsson | 320/5 |
| 5,469,043 A | 11/1995 | Cherng et al. | 320/31 |
| 5,485,090 A | 1/1996 | Stephens | 324/433 |
| 5,488,300 A | 1/1996 | Jamieson | 324/432 |
| 5,519,383 A | 5/1996 | De La Rosa | 340/636 |
| 5,528,148 A | 6/1996 | Rogers | 324/426 |
| 5,537,967 A * | 7/1996 | Tashiro et al. | 123/192.1 |
| 5,546,317 A | 8/1996 | Andrieu | 364/481 |
| 5,548,273 A * | 8/1996 | Nicol et al. | 340/439 |
| 5,550,485 A | 8/1996 | Falk | 324/772 |
| 5,561,380 A | 10/1996 | Sway-Tin et al. | 324/509 |
| 5,562,501 A | 10/1996 | Kinoshita et al. | 439/852 |
| 5,572,136 A | 11/1996 | Champlin | 324/426 |
| 5,574,355 A | 11/1996 | McShane et al. | 320/39 |
| 5,583,416 A | 12/1996 | Klang | 320/22 |
| 5,585,728 A | 12/1996 | Champlin | 324/427 |
| 5,589,757 A | 12/1996 | Klang | 320/22 |
| 5,592,093 A | 1/1997 | Klingbiel | 324/426 |
| 5,596,260 A | 1/1997 | Moravec et al. | 320/30 |
| 5,598,098 A | 1/1997 | Champlin | 324/430 |
| 5,602,462 A | 2/1997 | Stich et al. | 323/258 |
| 5,606,242 A | 2/1997 | Hull et al. | 320/48 |
| 5,621,298 A | 4/1997 | Harvey | 320/5 |
| 5,642,031 A | 6/1997 | Brotto | 320/21 |
| 5,650,937 A | 7/1997 | Bounaga | 364/483 |
| 5,652,501 A | 7/1997 | McClure et al. | 320/17 |
| 5,656,920 A | 8/1997 | Cherng et al. | 320/31 |
| 5,675,234 A | 10/1997 | Greene | 320/15 |
| 5,677,077 A | 10/1997 | Faulk | 429/90 |
| 5,699,050 A | 12/1997 | Kanazawa | 340/636 |
| 5,701,089 A | 12/1997 | Perkins | 327/772 |
| 5,705,929 A | 1/1998 | Caravello et al. | 324/430 |
| 5,710,503 A | 1/1998 | Sideris et al. | 320/6 |
| 5,717,336 A | 2/1998 | Basell et al. | 324/430 |
| 5,717,937 A | 2/1998 | Fritz | 395/750.01 |
| 5,747,909 A * | 5/1998 | Syverson et al. | 310/156 |
| 5,757,192 A | 5/1998 | McShane et al. | 324/427 |
| 5,760,587 A | 6/1998 | Harvey | 324/434 |
| 5,773,978 A | 6/1998 | Becker | 324/430 |
| 5,789,899 A | 8/1998 | van Phuoc et al. | 320/30 |
| 5,793,359 A | 8/1998 | Ushikubo | 345/169 |
| 5,808,469 A | 9/1998 | Kopera | 324/43.4 |
| 5,821,756 A | 10/1998 | McShane et al. | 324/430 |
| 5,831,435 A | 11/1998 | Troy | 324/426 |
| 5,862,515 A | 1/1999 | Kobayashi et al. | 702/63 |
| 5,872,443 A | 2/1999 | Williamson | 320/21 |
| 5,895,440 A | 4/1999 | Proctor et al. | 702/63 |
| 5,914,605 A | 6/1999 | Bertness | 324/430 |

| | | | |
|---|---|---|---|
| 5,929,609 A | 7/1999 | Joy et al. .................... 322/25 |
| 5,939,861 A | 8/1999 | Joko et al. | |
| 5,945,829 A | 8/1999 | Bertness .................... 324/430 |
| 6,002,238 A | 12/1999 | Champlin ................... 320/134 |
| 6,008,652 A | 12/1999 | Theofanopoulos et al. . 324/434 |
| 6,009,369 A | 12/1999 | Boisvert et al. ............. 701/99 |
| 6,031,354 A | 2/2000 | Wiley et al. ................ 320/116 |
| 6,037,751 A | 3/2000 | Klang ........................ 320/160 |
| 6,037,777 A | 3/2000 | Champlin ................... 324/430 |
| 6,051,976 A | 4/2000 | Bertness .................... 324/426 |
| 6,072,299 A | 6/2000 | Kurie et al. ................ 320/112 |
| 6,072,300 A | 6/2000 | Tsuji ......................... 320/116 |
| 6,081,098 A | 6/2000 | Bertness et al. ............ 320/134 |
| 6,091,245 A | 7/2000 | Bertness .................... 324/426 |
| 6,094,033 A | 7/2000 | Ding et al. ................. 320/132 |
| 6,104,167 A | 8/2000 | Bertness et al. ............ 320/132 |
| 6,114,834 A | 9/2000 | Parise ......................... 702/63 |
| 6,137,269 A | 10/2000 | Champlin ................... 320/150 |
| 6,150,793 A | * 11/2000 | Lesesky et al. ............. 320/104 |
| 6,163,156 A | 12/2000 | Bertness .................... 324/426 |
| 6,172,483 B1 | 1/2001 | Champlin ................... 320/134 |
| 6,172,505 B1 | 1/2001 | Bertness .................... 324/430 |

FOREIGN PATENT DOCUMENTS

| | | |
|---|---|---|
| JP | 59215674 | 12/1984 |
| JP | 60225078 | 11/1985 |
| JP | 62-180284 | 8/1987 |
| JP | 03274479 | 12/1991 |
| JP | 03282276 | 12/1991 |
| JP | 404008636 A * | 1/1992 |
| JP | 04131779 | 5/1992 |
| JP | 04372536 | 12/1992 |
| JP | 5216550 | 8/1993 |
| JP | 7-128414 | 5/1995 |
| WO | WO 93/22666 | 11/1993 |
| WO | WO 98/58270 | 12/1998 |

OTHER PUBLICATIONS

"A Package for Impedance/Admittance Data Analysis", by B. Boukamp, *Solid State Ionics*, 1986, pp. 136–140.

"Precision of Impedance Spectroscopy Estimates of Bulk, Reaction Rate, and Diffusion Parameters", by J. Macdonald et al., *J. Electroanal, Chem.*, 1991, pp. 1–11.

Internal Resistance: Harbinger of Capacity Loss in Starved Electrolyte Sealed Lead Acid Batteries, by Vaccaro, F.J. et al., *AT&T Bell Laboratories*, 1987 IEEE, Ch. 2477, pp. 128, 131.

IEEE Recommended Practice For Maintenance, Testings, and Replacement of Large Lead Storage Batteries for Generating Stations and Substations, *The Institute of Electrical and Electronics Engineers, Inc., ANSI/IEEE Std.* 450–1987, Mar. 9, 1987, pp. 7–15.*

"Field and Laboratory Studies to Assess the State of Health of Valve–Regulated Lead Acid Batteries: Part I Conductance/Capacity Correlation Studies", by D. Feder et al., *IEEE*, Aug. 1992, pp. 218–233.*

"Battery Impedance", by E. Willihnganz et al., *Electrical Engineering*, Sep. 1959, pp. 922–925.

"JIS Japanese Industrial Standard–Lead Acid Batteries for Automobiles", *Japanese Standards Association UDC*, 621.355.2:629.113.006, Nov. 1995.

"Performance of Dry Cells", by C. Hambuechen, Preprint of *Am. Electrochem. Soc.*, Apr. 18–20, 1912, paper No. 19, pp. 1–5.

"A Bridge for Measuring Storage Battery Resistance", by E. Willihncanz, *The Electrochemical Society*, preprint 79–20, Apr. 1941, pp. 253–258.

* cited by examiner

ALTERNATOR DIAGNOSTIC SYSTEM

BACKGROUND OF THE INVENTION

The present invention relates to devices for testing an automobile. More specifically, the present invention relates to a device for testing an alternator of the type used to charge a battery in an automotive vehicle.

Automotive vehicles include a storage battery for operating electronics in the vehicle and using an electric starter to start the vehicle engine. A battery charging system is coupled to the engine and is powered by the engine when the vehicle is running. The charging system is used to charge the storage battery when the vehicle is operating.

Many attempts have been made to test the battery of the vehicle. One successful technique which has been pioneered by Dr. Keith S. Champlin and Midtronics, Inc. of Burr Ridge, Ill. relates to measuring the conductance of batteries to determine their condition. This technique is described in a number of United States patents, for example, U.S. Patent Nos. U.S. Pat. No. 3,873,911, issued Mar. 25, 1975, to Champlin, entitled ELECTRONIC BATTERY TESTING DEVICE; U.S. Pat. No. 3,909,708, issued Sep. 30, 1975, to Champlin, entitled ELECTRONIC BATTERY TESTING DEVICE; U.S. Pat. No. 4,816,768, issued Mar. 28, 1989, to Champlin, entitled ELECTRONIC BATTERY TESTING DEVICE; U.S. Pat. No. 4,825,170, issued Apr. 25, 1989, to Champlin, entitled ELECTRONIC BATTERY TESTING DEVICE WITH AUTOMATIC VOLTAGE SCALING; U.S. Pat. No. 4,881,038, issued Nov. 14, 1989, to Champlin, entitled ELECTRONIC BATTERY TESTING DEVICE WITH AUTOMATIC VOLTAGE SCALING TO DETERMINE DYNAMIC CONDUCTANCE; U.S. Pat. No. 4,912,416, issued Mar. 27, 1990, to Champlin, entitled ELECTRONIC BATTERY TESTING DEVICE WITH STATE-OF-CHARGE COMPENSATION; U.S. Pat. No. 5,140,269, issued Aug. 18, 1992, to Champlin, entitled ELECTRONIC TESTER FOR ASSESSING BATTERY/CELL CAPACITY; U.S. Pat. No. 5,343,380, issued Aug. 30, 1994, entitled METHOD AND APPARATUS FOR SUPPRESSING TIME VARYING SIGNALS IN BATTERIES UNDERGOING CHARGING OR DISCHARGING; U.S. Pat. No. 5,572,136, issued Nov. 5, 1996, entitled ELECTRONIC BATTERY TESTER WITH AUTOMATIC COMPENSATION FOR LOW STATE-OF-CHARGE; U.S. Pat. No. 5,574,355, issued Nov. 12, 1996, entitled METHOD AND APPARATUS FOR DETECTION AND CONTROL OF THERMAL RUNAWAY IN A BATTERY UNDER CHARGE; U.S. Pat. No. 5,585,728, issued Dec. 17, 1996, entitled ELECTRONIC BATTERY TESTER WITH AUTOMATIC COMPENSATION FOR LOW STATE-OF-CHARGE; U.S. Pat. No. 5,592,093, issued Jan. 7, 1997, entitled ELECTRONIC BATTERY TESTING DEVICE LOOSE TERMINAL CONNECTION DETECTION VIA A COMPARISON CIRCUIT; U.S. Pat. No. 5,598,098, issued Jan. 28, 1997, entitled ELECTRONIC BATTERY TESTER WITH VERY HIGH NOISE IMMUNITY; U.S. Pat. No. 5,757,192, issued May 26, 1998, entitled METHOD AND APPARATUS FOR DETECTING A BAD CELL IN A STORAGE BATTERY; U.S. Pat. No. 5,821,756, issued Oct. 13, 1998, entitled ELECTRONIC BATTERY TESTER WITH TAILORED COMPENSATION FOR LOW STATE-OF-CHARGE; and U.S. Pat. No. 5,831,435, issued Nov. 3, 1998, entitled BATTERY TESTER FOR JIS STANDARD.

With the advent of accurate battery testing, it has become apparent that in some instances the battery in the vehicle may be good, and a problem related to the battery charging system is the cause of a perceived battery failure. A battery charging system in a vehicle generally includes the battery, an alternator, a regulator and an alternator drive belt. In most modern vehicles, the regulator is built into the alternator housing and is referred to as an internal regulator. The role of the charging system is two fold. First, the alternator provides charging current for the battery. This charging current ensures that the battery remains charged while the vehicle is being driven and therefore will have sufficient capacity to subsequently start the engine or run vehicle electronics when the engine is off. Second, the alternator provides an output current for all of the vehicle electrical loads. In general, the alternator output, the battery capacity, the starter draw and the vehicle electrical load requirements are matched to each other for optimal performance. In a properly functioning charging system, the alternator will be capable of providing enough current to drive the vehicle electrical loads while simultaneously charging the battery. Typically, alternators range in size from 60 to 120 amps.

A number of charging system testers have been used to evaluate the performance of the vehicle charging system. These testers generally use an inductive "amp clamp." The amp clamp is placed around a cable or wire and inductively couples to current flowing in the cable or wire in the vehicle such that the current can be measured. This measurement can be made without having to disconnect the wire. In such a system, typically the operator determines the rated size of the alternator. Next, the operator connects the amp clamp to the output cable of the alternator and an electrical load such as a carbon pile load tester, is placed across the battery. This is a large resistive load capable of receiving several hundred amps which will force the alternator to provide its maximum output. The maximum output current can then be measured using the amp clamp connection. If the measured output is less than the rated output, the alternator is determined to be malfunctioning. Such a test is cumbersome as the equipment is large and difficult to handle. Further, it is difficult, particularly with compact engines, to reach the alternator output cable. Further, in some cases, the amp clamp may not fit around the output cable. It is also very easy to place the amp clamp around the wrong cable causing a false test.

Another testing technique is described in U.S. Pat. No. 4,207,611, which issued Jun. 10, 1980 and is entitled APPARATUS AND METHOD FOR CALIBRATED TESTING OF A VEHICLE ELECTRICAL SYSTEM. The device described in this reference monitors voltage changes present at the cigarette lighter of an automotive vehicle in order to determine the condition of the alternator by applying internal loads such as head lamps and blowers, while the engine is running.

However, these techniques for testing alternators rely upon monitoring the output from the alternator.

SUMMARY OF THE INVENTION

An apparatus for testing an alternator in an automotive vehicle includes a sensor configured to be positioned proximate the alternator which provides a vibration output related to vibrations generated by operation of the alternator. An amplifier coupled to the vibration output is configured to responsively provide an amplified output. A diagnostic system coupled to the amplified output provides a diagnostic output related to condition of the alternator. In another aspect, a temperature sensor is used to perform the diagnosis.

DETAILED DESCRIPTION OF THE ILLUSTRATIVE EMBODIMENTS

Figure 1:
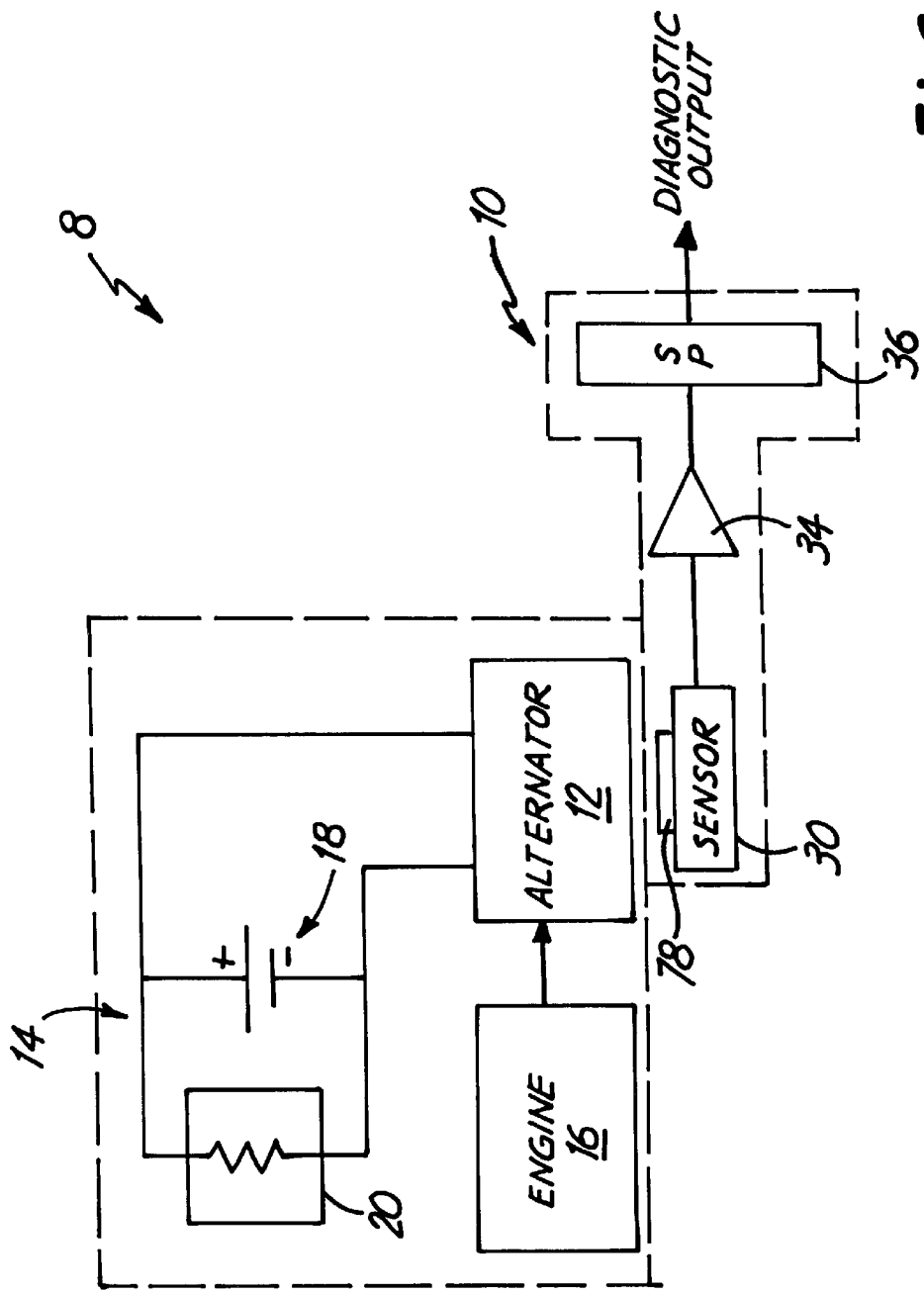
FIG. 1 is a simplified block diagram showing a device in accordance with present invention coupled to a alternator of a vehicle.

FIG. 1 is a simplified block diagram 8 showing a alternator test device 10 for diagnosing operation of an alternator 12 in a vehicle 14 which operates in accordance with principles of the present invention.

Vehicle 14 includes engine 16 which provides power to alternator 12. For example, alternator 12 can be coupled to the drive shaft of engine 16 through a belt and pulley arrangement. Alternator 14 is coupled across the positive and negative terminals of battery 18. Battery 18 provides power to the loads of the vehicle 14 which are represented by resistor 20. While engine 16 is operated, alternator 12 provides a voltage to the terminals of battery 18 which is greater than the nominal voltage of battery 18 to thereby charge battery 18.

Alternator 12 operates by moving a coil in a magnetic field. This causes current to flow in the coil. However, this movement must be supported by a bearing system, such as ball bearings. Over time, the bearings can fail leading to failure of the alternator. Another example failure mode is a loss of balance in the alternator. However, prior to failure, the output from the alternator may provide little indication of the physical bearing failure. Further, even after the alternator has failed it may be difficult to diagnose the cause of the failure.

In accordance with the principles of the present invention, device 10 includes a sensor 30 which is positioned proximate alternator 12. Sensor 30 is configured to sense vibrations from alternator 12. In various aspects of the invention, these vibrations can be in any frequency range. The vibrations can be transmitter to sensor 30 mechanically or acoustically through air or other coupling medium. For example, sensor 30 can comprise an acoustic sensor such as a microphone. An output from sensor 30 is provided to amplifier 34. Amplifier 34 provides an amplified output to a diagnostic system signal processing system 36. For example, signal processor 36 can comprise a digital signal processing system. The diagnostic system 36 provides a diagnostic output indicative of a condition of alternator 12.

The signal processor 36 can, for example, filter the amplified output to identify those signal components which have been determined to be indicative of a bearing failure or other failure in alternator 12. The signal processing can be through simple analog filtering techniques or can be through more complex digital signal processing techniques implemented in a microprocessing system or in a dedicated digital signal processing system. Typical digital signal processing systems or algorithms operate in the frequency domain by transforming an input signal into a numerical representation of frequency components. This can be through, for example, a Fourier transformation or a wavelet transformation. Both techniques are known in the art. Wavelet transformations can be particularly advantageous because, unlike Fourier transformations, they provide information related to time domain aspects of the signal. This time domain information can be used to identify particular signal frequency characteristics which change over time.

The particular signals used to identify alternator failure can be determined experimentally by monitoring operation of numerous different types of alternators over their lifetimes. The system can be calibrated such that the diagnostic output can provide a time to failure or lifetime indication. The diagnostic information can be analyzed using simple threshold techniques or through more complex analysis techniques such as fuzzy logic or neural networks. With a neural network, the system can be trained to recognize nominal operation of alternator 12 or various failure modes of alternator 12.

Figure 2:
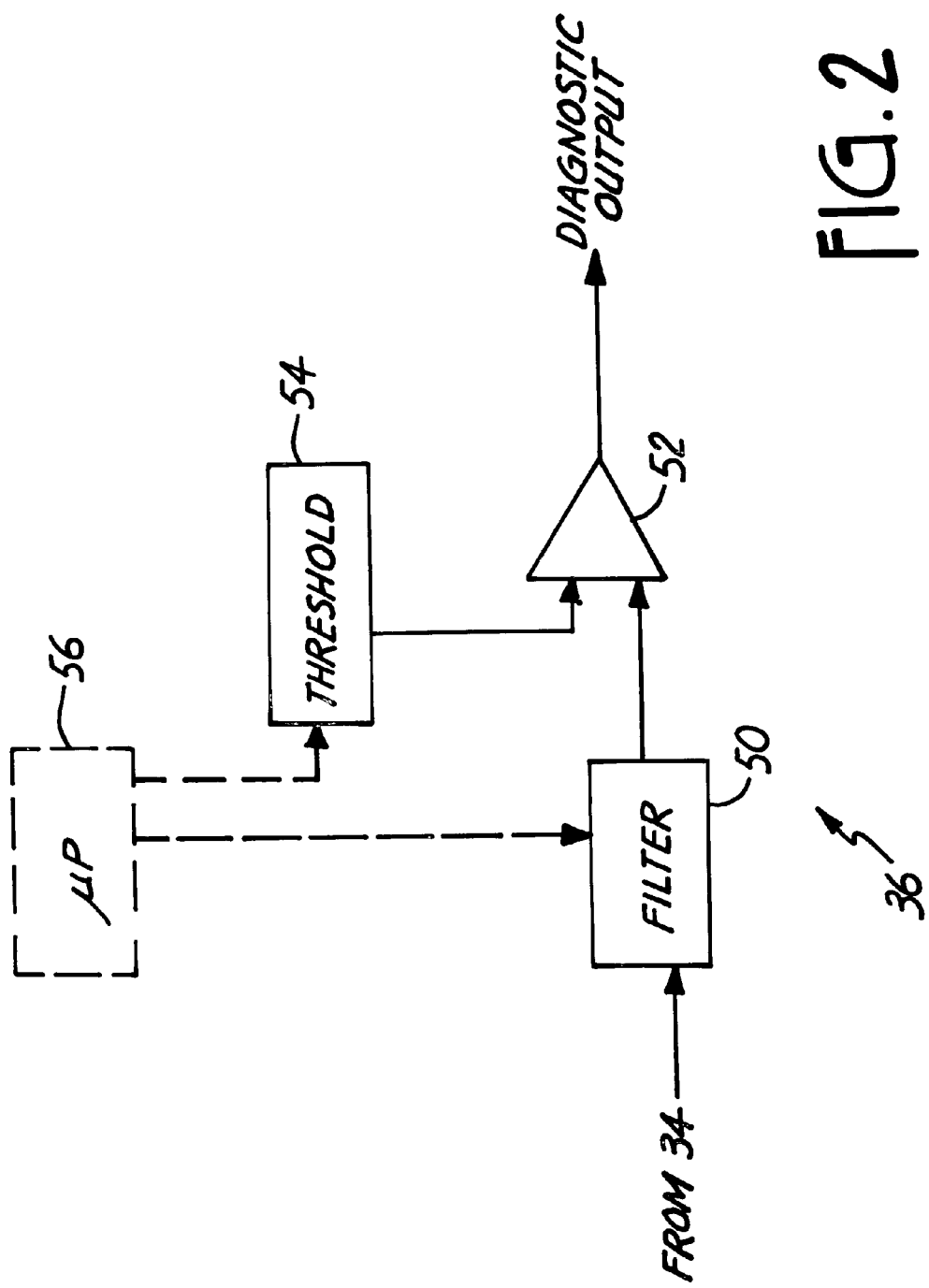
FIG. 2 is a block diagram showing one embodiment of the diagnostics system shown in FIG. 1 in greater detail.

FIG. 2 is a simplified block diagram showing one embodiment of diagnostic system 36 in greater detail. In the embodiment shown in FIG. 2, a very simple example is provided. A filter 50 filters the amplified signal from amplifier 34. A comparator 52 compares the filtered signal with a threshold level provided by threshold circuitry 54. Based upon this comparison, the diagnostic output is provided. The filter can be high pass, low pass or a band pass filter, for example. The particular characteristics of filter 50 can be determined based upon testing alternators. For example, abnormal frequency components between 100 Hz and 2000 Hz can indicate a battery failure in the alternator. Similarly, the threshold can be determined through testing of alternators and based upon the desired sensitivity of the system. An optional microprocessor 56 can be used to control either or both the filtered characteristic of filter 50 and/or the threshold level of threshold circuitry 54. Filter 50 and comparator 52 can be implemented either using digital or analog techniques. As discussed above, much more advanced signal processing techniques can be used to implement the present invention. With such advanced techniques, the diagnostic system 36 can better reject signals which are not associated with alternator failure and reduce the effects of ambient noise. Further, the diagnostic output from the signal processing can itself be processed using various techniques, as discussed above, such as neural networks, fuzzy logic, or an advanced rule based or artificial intelligence system. In addition to identifying frequency components, the diagnostic system can identify patterns in the sensor output.

Device 10 can be mounted permanently in vehicle 14, can be temporarily coupled to vehicle 14 by service personnel or can be used in a bench test in which the alternator is removed from the vehicle and tested by spinning the alternator. For example, during a normal engine tune-up, a technician could couple device 10 to alternator 12 to determine the condition or estimated lifetime of alternator 12. Further, if the vehicle is experiencing some form of charging system failure, device 10 can be used to identify a specific physical failure in the alternator, such as a bearing failure, as the source of the failure. In one embodiment, outputs from device 10 can be displayed in vehicle 14 to alert operator of the condition of the alternator or can be stored in diagnostic circuitry in vehicle 14 such that service personnel are alerted to the failure when servicing the vehicle. Further, other techniques can be used to communicate the diagnostic information such as a remote link through RF or infrared, or by electronic communication such as through a modem or through the internet.

In one aspect of the invention, the diagnostic system is implemented using an analog to digital converter and computation circuitry performing a Fourier transform such as a Fast Fourier Transform (FFT). In such an embodiment, an analog filter can also be used to filter the sensor output signal prior to digitization. An amplifier can also be used to amplify the signal. The amplifier can have a non-linear response such that the analog to digital converter is not driven into saturation. An automatic gain control can also be used to adjust the signal level prior to digitization. In embodiments which do not use an analog to digital converter and simply use an analog filter, in one aspect the analog filter comprises a band-pass filter with a band-pass frequency which is controlled by the microprocessor. The microprocessor can sweep the band-pass filter through a frequency range to thereby identify peaks in the sensor output signal. In general, the filtering can be used to reduce ambient noise in the sensor output. Another technique to reduce the ambient noise in the sensor output is to use a direction sensor which can be aimed at the alternator such that it is less sensitive to surrounding noise. The determination of the condition of the alternator can be based upon the type of alternator being tested. Such information can be received through an input. For example, alternator, engine or vehicle make or model can be received from an external source.

Figure 3:
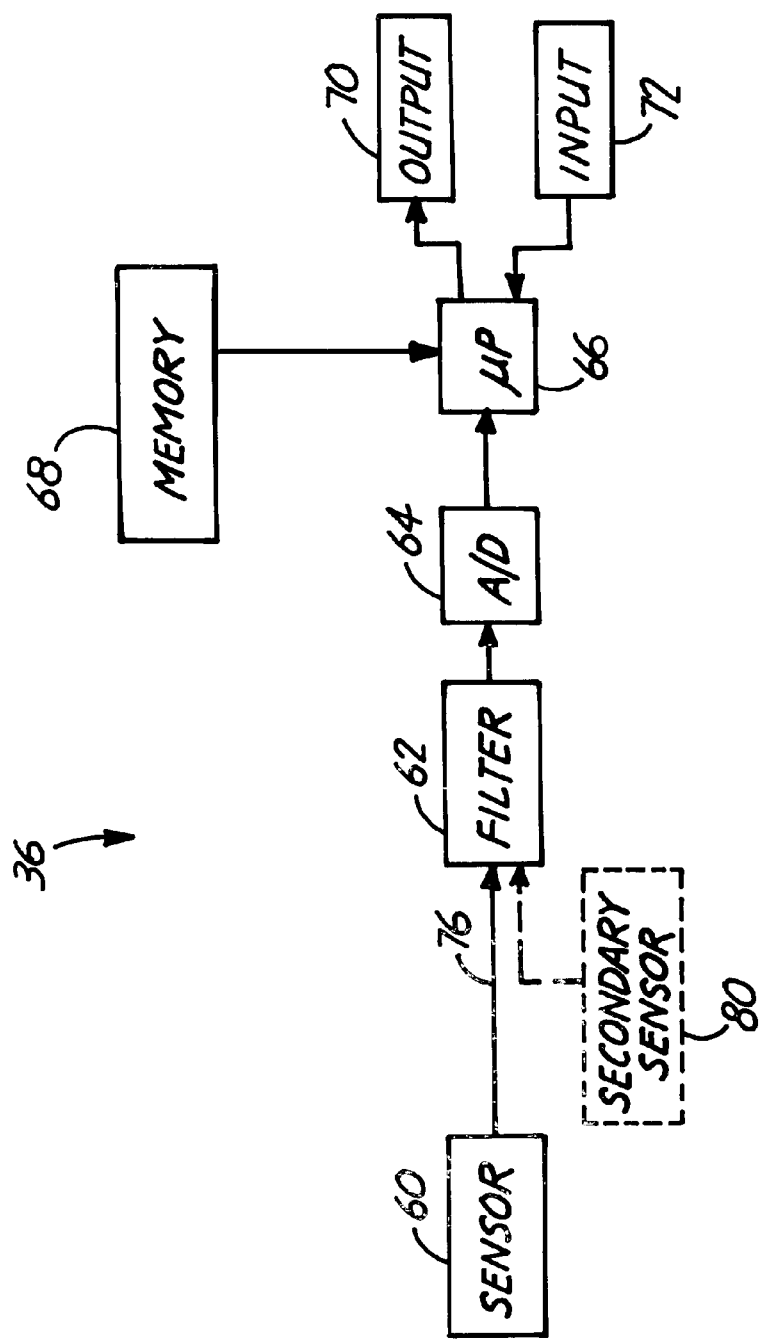
FIG. 3 is a block diagram showing one embodiment of the diagnostics system of FIG. 1 in greater detail.

FIG. 3 is a simplified block diagram of another embodiment of diagnostic system 36. In the embodiment of FIG. 3, a sensor 60 couples to the alternator 12, either directly or at a distance. In one embodiment, an amplifier such as amplifier 34 is included as an integral part of sensor 60. An optional analog filter 62 performs some prefiltering on the output from sensor 60 prior to digital conversion by analog to digital converter 64. Microprocessor 66 operates in accordance with programming instructions stored in, for example, memory 68. The diagnostic output can be provided on output 70 which can be a visual display or a data output such as a transmission to another computer system or a remote location. An input 72 receives data and is used to control the testing. In one embodiment, input 72 is used to receive information regarding the type of alternator 12 or engine 16 under test. For example, input 72 can be user input. Microprocessor 66 can retrieve alternator specific information from memory 68 such that the diagnostics can be tailored to the nominal characteristics for a particular alternator.

The sensor of the present invention can be any type of vibration or acoustic sensor. For example, the sensor can comprise a piezo electric sensor, an electrostatic sensor, a moving coil, an electrit condenser or an accelerometer. In another aspect of the invention, sensor 30 or 60 comprises a temperature sensor which is used to detect abnormal thermal variations in the alternator 12. For example, if there is a bearing failure in the alternator, heat will be generated due to friction in the bearing. The temperature sensor can detect such heat generation. In one embodiment, the high temperature is detected by comparing the sensor output to a threshold. In such an embodiment, no filtering of the sensor output signal is necessary. If the sensor output is greater than the threshold, then the diagnostic output can provide an indication of the failure. As discussed above, other more advanced signal processing techniques can also be used. Various examples of temperature sensors include a thermocouple, a thermistor, an RTD, a temperature sensitive semiconductor device, an IR thermopile or other infrared sensor.

In another aspect of the invention, the sensor 30 or 60 does not physically couple to the external circuitry. Instead, a non-physical connection is provided such as through radio frequency (RF) or infrared (IR). For example, in such an embodiment sensor 60 includes an RF or an IR output which is modulated to thereby carry the sensor output on link 76 shown in FIG. 3. This allows the majority of the test equipment to be located remotely from the sensor. Further, in such an embodiment there are no loose wires or cabling which could become entangled in the various moving parts of the engine 16. In such an embodiment, sensor 60 may include an internal power source such as an internal battery. Furthermore, in such an embodiment the diagnostic system 36 includes an IR or an RF receiver to receive information from the sensor 30. In a more advanced embodiment, the communication link 76 is bidirectional such that the sensor 60 can be controlled by diagnostic system 36. For example, the amplification, analog to digital conversion or filtering of the sensor signal can be performed within sensor 60 under the control of microprocessor 66. This allows the sensor output to be partially or completely processed prior to transmission.

FIG. 3 also illustrates a sensor 80 in accordance with another aspect. Sensor 80 can be another sensor similar to sensor 60 which is used to reduce ambient noise in the diagnostics. For example, if sensor 80 is spaced apart from sensor 60 ambient vibrations or noise can be filtered by filter 62 and digitized by analog to digital converter 64 and used by microprocessor 66 to subtract or otherwise reduce ambient noise from the diagnostic measurement. For example, ambient vibration, acoustic noise or thermal noise can be reduced through such an embodiment. The reduction can be through digital techniques or through analog techniques. The secondary sensor 80 can be used to provide a nominal baseline signal for comparison of the output from sensor 60 which acts as a primary sensor.

In another aspect of the invention, a removable coupling such as coupling 78 in FIG. 1 is provided to couple sensor 30 or 60 to the vicinity alternator 12. For example, a magnet, or other removable mount can be provided for attaching the sensor. Other examples of such mounts include a suction cup, removable tape, a detachable band or a clip. In another aspect, the sensor is spaced apart from the alternator 12, although in close proximity, and the sensor is aimed in a direction toward alternator 12. For example, if a directional acoustic sensor is used or a directional thermal sensor such as an IR sensor is used, the sensor can be pointed toward the alternator without having to physically couple to the alternator.

The alternator testing apparatus of the present invention can be implemented with other diagnostic systems such as an engine analyzer, battery charger, battery tester, etc. This configuration allows service personnel to have the alternator test readily available while they are servicing an automobile. Further, if for example, a battery test indicates that a battery is good even though the automotive vehicle operator has indicated battery failures, the alternator testing device of the present invention can be used to test the alternator.

Although the present invention has been described with reference to preferred embodiments, workers skilled in the art will recognize that changes may be made in form and detail without departing from the spirit and scope of the invention.

What is claimed is:

1. An apparatus for-testing an alternator of the type used in an automotive vehicle, comprising:
    a sensor configured to sense vibrations from the alternator and provide a vibration output related to vibrations generated by operation of the alternator;
    an amplifier coupled to the vibration output configured to responsively provide an amplified output; and
    a diagnostic system coupled to the amplified output configured to provide a diagnostic output related to condition of the alternator.

2. The apparatus of claim 1 wherein the sensor comprises a vibration sensor.

3. The apparatus of claim 1 wherein the sensor comprises an acoustic sensor.

4. The apparatus of claim 1 wherein the vibration output is related to operation of bearings in the alternator.

5. The apparatus of claim 1 wherein the diagnostic system includes a microprocessor.

6. The apparatus of claim 1 wherein the diagnostic system includes a digital signal processing algorithm configured to analyze frequency components in the amplified output.

7. The apparatus of claim 1 wherein the diagnostic system is configured to isolate at least one frequency component.

8. The apparatus of claim 1 wherein the diagnostic system is configured to identify signal patterns contained in the amplified output.

9. The apparatus of claim 1 wherein the diagnostic output is indicative of failure of the alternator.

10. The apparatus of claim 1 wherein the diagnostic output is indicative of expected lifetime of the alternator.

11. The apparatus of claim 1 wherein the diagnostic system performs a Fourier transform of the amplified signal.

12. The apparatus of claim 1 wherein the diagnostic system performs a wavelet transformation of the amplified output.

13. The apparatus of claim 1 wherein the diagnostic system includes a filter.

14. The apparatus of claim 13 wherein the filter comprises a digital filter.

15. The apparatus of claim 13 wherein the filter comprises an analog filter.

16. The apparatus of claim 15 wherein the filter comprises a band-pass filter.

17. The apparatus of claim 15 wherein the diagnostic system includes a microprocessor configured to change the filter characteristics of the analog filter.

18. The apparatus of claim 1 wherein the diagnostic output comprises frequency and amplitude information.

19. The apparatus of claim 1 wherein the sensor is directional and is configured to be pointed in a direction toward the alternator.

20. The apparatus of claim 1 wherein the sensor is configured to physically couple to the alternator.

21. The apparatus of claim 20 including a magnet to couple the sensor to the alternator.

22. The apparatus of claim 20 including a suction cup configured to couple the sensor to the alternator.

23. The apparatus of claim 20 including a removable mount configured to mount the sensor onto the alternator to thereby secure the sensor to the alternator.

24. The apparatus of claim 1 including a non-physical link extending between the sensor and the diagnostic system.

25. The apparatus of the claim 24 wherein the non-physical link comprises a radio frequency (RF) link.

26. The apparatus of claim 24 wherein the non-physical link comprises an infrared (IR) link.

27. The apparatus of claim 1 wherein the diagnostic output is indicative of an abnormal condition in the alternator.

28. The apparatus of claim 1 wherein the diagnostic system includes a threshold and the diagnostic output is a function of a comparison of the threshold to the amplified output.

29. The apparatus of claim 1 including a secondary sensor configured to be positioned spaced apart from the alternator and provide an ambient vibration output related to ambient vibrations, wherein the secondary sensor output is used to reduce ambient noise in the vibration output.

30. A method for testing an alternator in an automotive vehicle, comprising:
   sensing vibrations generated by operation of the alternator;
   amplifying the sensed vibrations; and
   diagnosing a condition of the alternator as a function of the amplified sensed vibrations.

31. The method of claim 30 wherein sensing vibrations comprises using an acoustic sensor.

32. The method of claim 30 wherein sensing vibrations comprises using a vibration sensor physically coupled to the alternator.

33. The method of claim 30 wherein diagnosing a condition includes filtering the amplified sensed vibrations.

34. The method of claim 33 wherein the filtering comprises digital filtering.

35. The method of claim 30 wherein diagnosing a condition comprises comparing a frequency component of the amplified vibration signal to a threshold.

36. The method of claim 30 wherein diagnosing a condition includes performing a Fourier transform.

37. The method of claim 30 including transmitting a sensor output over a non-physical link to a diagnostic system.

38. The method of claim 30 wherein diagnosing a condition includes detecting an abnormal condition in the alternator.

39. The method of claim 38 wherein the abnormal condition comprises a failed bearing.

40. The method of claim 30 including reducing ambient noise in the sensed vibrations as a function of sensed ambient noise.

41. An apparatus for testing an alternator of the type used in an automotive vehicle, comprising:
   a sensor configured to sense temperature of the alternator and provide a temperature output related to temperature generated by operation of the alternator;
   an amplifier coupled to the temperature output configured to responsively provide an amplified output; and
   a diagnostic system coupled to the amplified output configured to provide a diagnostic output related to condition of the alternator.

42. The apparatus of claim 41 wherein the sensor comprises a Resistance Temperature Detector.

43. The apparatus of claim 41 wherein the sensor comprises a thermocouple.

44. The apparatus of claim 41 wherein the sensor comprises a thermistor.

45. The apparatus of claim 41 wherein the sensor is configured to be physically coupled to the alternator.

46. The apparatus of claim 45 including a magnet to couple the sensor to the alternator.

47. The apparatus of claim 45 including a suction cup configured to couple the sensor to the alternator.

48. The apparatus of claim 45 including a clamp configured to clamp onto the alternator to thereby secure the sensor to the alternator.

49. The apparatus of claim 41 wherein the temperature output is related to operation of bearings in the alternator.

50. The apparatus of claim 41 wherein the diagnostic system includes a microprocessor.

51. The apparatus of claim 41 wherein the diagnostic output is indicative of failure of the alternator.

52. The apparatus of claim 41 wherein the diagnostic output is indicative of expected lifetime of the alternator.

53. The apparatus of claim 41 wherein the sensor is directional and is configured to be pointed in a direction toward the alternator.

54. The apparatus of claim 41 wherein the amplifier is physically coupled to the sensor.

55. The apparatus of claim 41 including a non-physical link extending between the sensor and the diagnostic system.

56. The apparatus of the claim 55 wherein the non-physical link comprises a radio frequency (RF) link.

57. The apparatus of claim 55 wherein the non-physical link comprises an infrared (IR) link.

58. The apparatus of claim 41 wherein the diagnostic output is indicative of an abnormal condition in the alternator.

59. The apparatus of claim 41 wherein the diagnostic system includes a threshold and the diagnostic output is a function of a comparison of the threshold to the amplified output.

60. The apparatus of claim 41 including a secondary sensor used to sense ambient temperature and wherein the diagnostic output is a function of the sensed ambient temperature.

61. A method for testing an alternator in an automotive vehicle, comprising:

sensing temperature generated by operation of the alternator; and diagnosing a condition of the alternator as a function of the sensed temperature.

62. The method of claim 61 wherein sensing temperature comprises using a temperature sensor physically coupled to the alternator.

63. The method of claim 61 wherein diagnosing a condition comprises comparing the sensed temperature to a threshold.

64. The method of claim 61 including transmitting a sensor output over a non-physical link to a diagnostic system.

65. The method of claim 61 wherein diagnosing a condition includes detecting an abnormal condition in the alternator.

66. The method of claim 65 wherein the abnormal condition comprises a failed bearing.

67. The method of claim 61 including sensing ambient temperature and diagnosing the condition of the alternator as a function of the sensed ambient temperature.

* * * * *

UNITED STATES PATENT AND TRADEMARK OFFICE
CERTIFICATE OF CORRECTION

PATENT NO.    : 6,363,303 B1
DATED         : March 26, 2002
INVENTOR(S)   : Kevin I. Bertness It is certified that error appears in the above-identified patent and that said Letters Patent is hereby corrected as shown below:

<u>Title page,</u>
Item [56], References Cited, OTHER PUBLICATIONS, the third publication should read: -- "Determining The End of Battery Life", by S. DeBardelaben, IEEE, 1986, pp. 365-368. --

Signed and Sealed this

Nineteenth Day of November, 2002

Attest:

Attesting Officer

JAMES E. ROGAN
*Director of the United States Patent and Trademark Office*